United States Patent
Gobert

(10) Patent No.: US 7,180,946 B2
(45) Date of Patent: Feb. 20, 2007

(54) CIRCUIT FOR FILTERING VIDEO DATA IN THE FREQUENCY DOMAIN

(75) Inventor: Jean Gobert, Maisons-Alfort (FR)

(73) Assignee: Koninklijke Philips Electronics N. V., Eindhoven (NL)

( * ) Notice: Subject to any disclaimer, the term of this patent is extended or adjusted under 35 U.S.C. 154(b) by 617 days.

(21) Appl. No.: 10/247,923

(22) Filed: Sep. 20, 2002

(65) Prior Publication Data

US 2003/0076882 A1    Apr. 24, 2003

(30) Foreign Application Priority Data

Sep. 25, 2001  (FR) .................................. 01 12325

(51) Int. Cl.
  *H04N 7/12*    (2006.01)
  *G06K 9/36*    (2006.01)
(52) U.S. Cl. ..................................... 375/240.2; 382/250
(58) Field of Classification Search ............. 375/240.2, 375/240.25, 240.29, 240.02, 240.03, 240.07, 375/240.18; 382/250; 708/321, 400
  See application file for complete search history.

(56) References Cited

U.S. PATENT DOCUMENTS

| | | | | |
|---|---|---|---|---|
| 5,168,375 A | * | 12/1992 | Reisch et al. ................ | 382/250 |
| 5,386,233 A | * | 1/1995 | Keith ..................... | 375/240.07 |
| 5,528,528 A | * | 6/1996 | Bui ............................ | 708/400 |
| 5,684,534 A | * | 11/1997 | Harney et al. ......... | 375/240.25 |
| 5,737,020 A | * | 4/1998 | Hall et al. ................ | 375/240.2 |
| 6,324,559 B1 | * | 11/2001 | Hellberg ..................... | 708/321 |
| 6,504,872 B1 | * | 1/2003 | Fimoff et al. ........... | 375/240.27 |
| 6,587,590 B1 | * | 7/2003 | Pan ............................ | 382/250 |

OTHER PUBLICATIONS

H. Park et al;, "On the POCS-Based PostProcessing Technique to Reduce the Blocking Artifacts in Transform Coded Images", IEEE Transactions on Circuits and Systems for Video Technology, IEEE Inc. New York, US, vol. 8, No. 3, Jun. 1, 1998, pp. 358-367, XP000767705.

* cited by examiner

*Primary Examiner*—Gims Philippe

(57) ABSTRACT

The present invention relates to a filter circuit for a set of original data (X0–X7) able to implement in series the steps of discrete transformation (DCT2), correction (ZER) of odd transformed data and inverse discrete transformation (IDCT2). The filter circuit takes advantage of the fact that the paths corresponding to the even and odd transformed data are completely separate with the exception of a first processing stage (ST1) of the discrete transformation and a last processing stage (ST8) of the inverse discrete transformation in order to connect a first half of the data issuing from the first stage to the last processing stage. The implementation of the filter circuit is thus simplified, both making the circuit less expensive and giving it a lower power consumption. For optimized implementation, the filter circuit functions in differential mode.

7 Claims, 7 Drawing Sheets

CIRCUIT FOR FILTERING VIDEO DATA IN THE FREQUENCY DOMAIN

The invention relates to a filter circuit for a set of original data able to implement in series the steps of discrete transformation, correction of odd transformed data and inverse discrete transformation.

It also relates to a method of filtering a set of original data comprising the aforementioned steps. Finally, it relates to a "computer program" product able to implement said data filtering method.

It finds its application in particular in video decoders and in television receivers, where the correction of digital images previously coded and decoded according to a block coding technique, the MPEG (from the English "Motion Pictures Expert Group") standard for example, is necessary for attenuating the visual artifacts caused by said block coding technique.

Video compression algorithms using block-based coding techniques sometimes result in a degradation of the quality of the coded and then decoded images. One of the visual artifacts most usually observed with these coding techniques is called blocking artifacts.

The article entitled "A projection-based post-processing technique to reduce blocking artifacts using a priori information on DCT coefficients of adjacent blocks", published by Hoon Paek and Sang-Uk Lee, in "Proceedings of $3^{rd}$ IEEE International Conference on Image Processing, Vol. 2, Lausanne, Switzerland, 16–19 Sep. 1996, p 53–56" describes a method of filtering data contained in a digital image. The purpose of this data filtering method is to correct the coefficients in the frequency domain, which correspond to these blocking artifacts.

It is based on the following principle. Let there be two adjacent segments u (13) and v (14), illustrated in FIG. 1, belonging respectively to two blocks (11, 12) of pixels (10), and disposed on each side of a block boundary (16). If a blocking artifact is present between the segments u and v, the segment w (15) corresponding to the concatenation of the first and second segments includes high spatial frequencies which go beyond those of the segments u and v.

Figure 2:
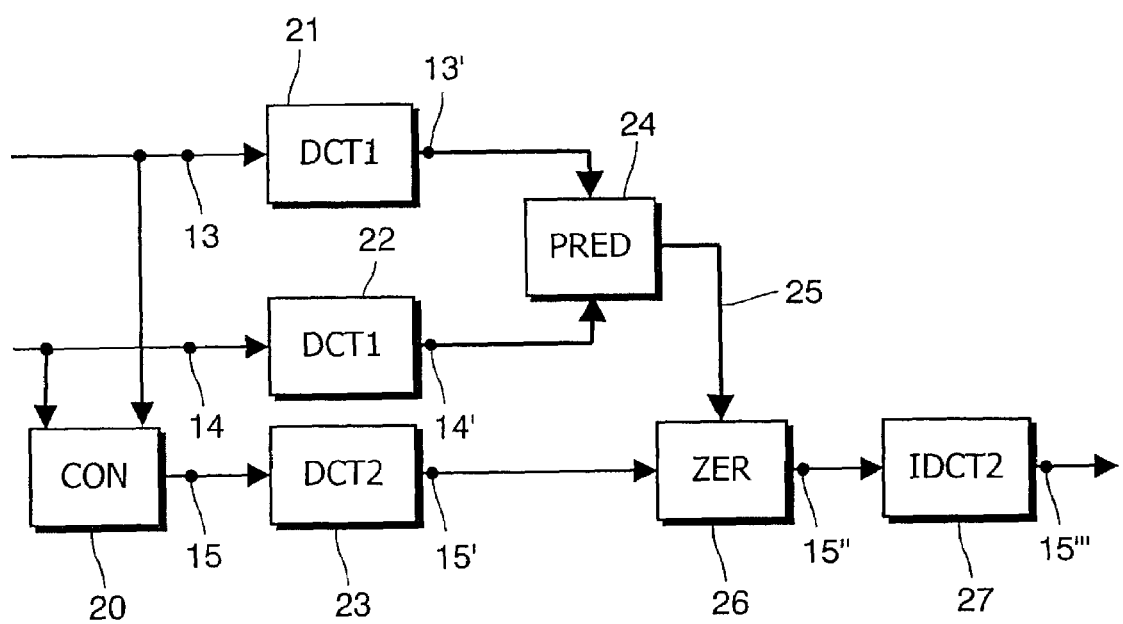

In order to find and eliminate the frequencies associated with the blocking artifacts, the data filtering method of the prior art, illustrated in FIG. 2, comprises the following steps of:

calculating a first discrete cosine transform DCT1 (21) of the segment u of N pixels with N=8 in the following example: U=DCT[u]={U(0), U(1), . . . , U(N−1)}, with $$U(k) = \alpha(k) \sum_{n=0}^{N-1} u(n)\cos\left(\frac{\pi(2n+1)k}{2N}\right)$$

where k is the frequency of the transformed data item U, k ∈[0, N−1];

calculating a second discrete cosine transform DCT1 (22) of the segment v of N pixels, adjacent to the segment u: V=DCT(v)={V(0), V(1), . . . , V(N−1)}, that is to say $$V(k) = \alpha(k) \sum_{n=0}^{N-1} v(n)\cos\left(\frac{\pi(2n+1)k}{2N}\right);$$

calculating a global discrete transform DCT2 (23) of the segment w of 2N that is to say 16 pixels corresponding to the concatenation CON (20) of the segments u and v: W=DCT(w)={W(0), W(1), . . . , W(2N−1)}, that is to say $$W(k) = \frac{1}{\sqrt{2}} \alpha(k) \sum_{n=0}^{2N-1} v(n)\cos\left(\frac{\pi(2n+1)k}{4N}\right);$$

calculating PRED (24) of a predicted maximum frequency kwpred (25) as a function of the maximum frequencies kumax and kvmax of U (13') and V (14'), as follows:

kwpred=2.max(kumax, kvmax)+2 with kumax=max(k ∈{0, . . . , N−1}/U(k)≠0), kvmax=max(k ∈{0, . . . , N−1}/V(k)≠0), and max is the function which gives the maximum of k from among a set of given values;

correcting ZER (26) by setting to zero the odd transformed data W (15') resulting from the global discrete transform whose frequency is higher than the predicted maximum frequency, producing corrected data (15");

calculating an inverse discrete cosine transform IDCT2 (27) of the corrected data, producing filtered data (15''') which are then intended to be displayed on the screen.

The purpose of the invention is to propose a data filter circuit making it possible to implement simply the data filtering method of the prior art.

Figure 3:
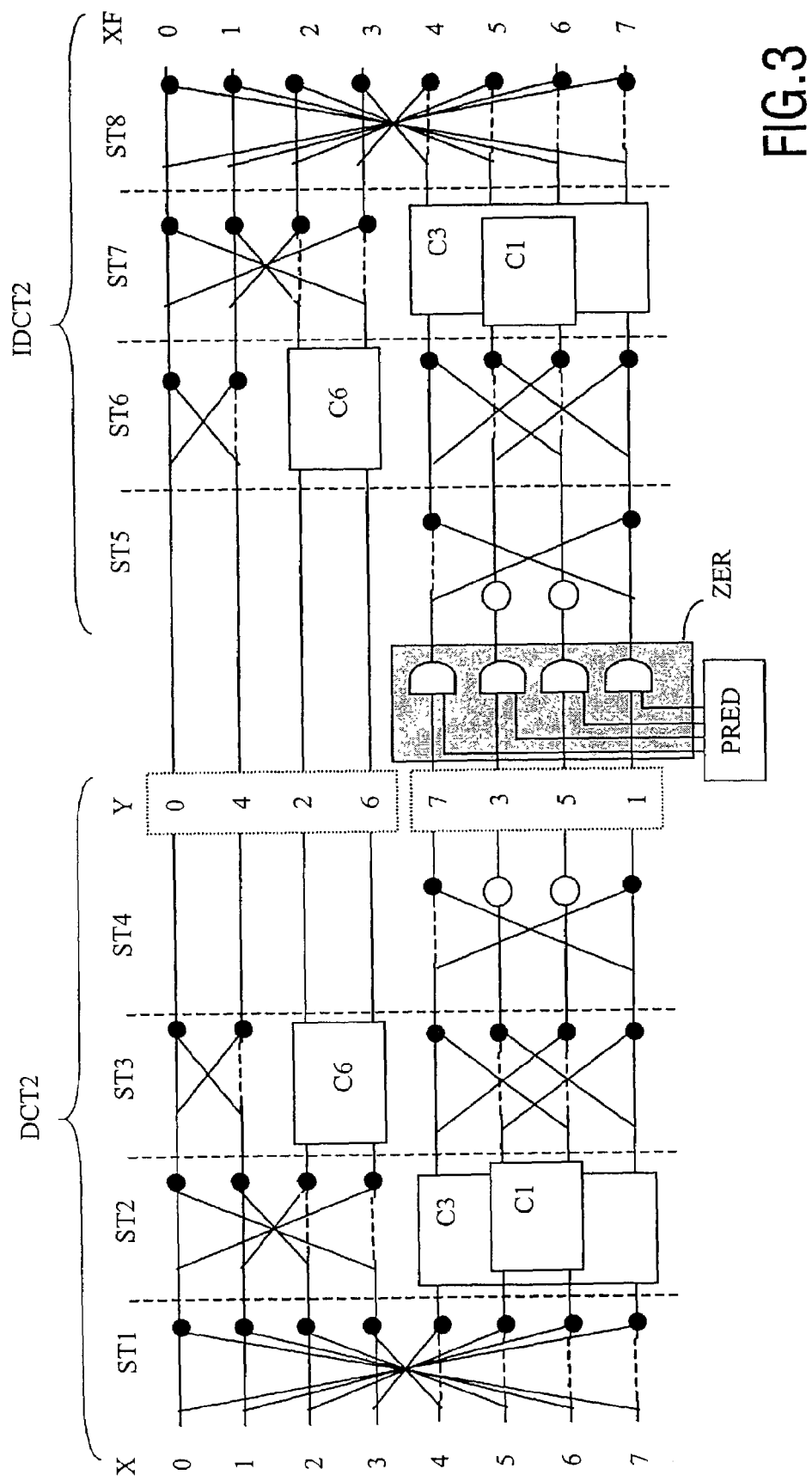

This is because the implementation of such a method may prove complex in terms of number of operations, in particular with regard to the sequence comprising the global discrete cosine transformation, followed by the correction of the odd transformed data and the inverse discrete cosine transform. FIG. 3 illustrates what would be a conventional implementation of such a sequence in the case where 2N=8. The direct discrete cosine transformation (DCT2) and inverse discrete cosine transformation (IDCT2) process the 2N concatenated data X0 to X7 using the Lee algorithm. The black dots represent additions or subtractions, a horizontal dotted line preceding a black dot corresponding to a data item to be subtracted. The white dots correspond to multiplications. Multiplications and divisions by a power of two have not been shown on the diagram in FIG. 3 since they have little influence on the complexity of the implementation.

The implementation of the global discrete cosine transformation (DCT2) comprises four successive stages separated in FIG. 3 by vertical dotted lines, namely:

a first stage (ST1) comprising eight adders (performing additions or subtractions) for the concatenated data, a second stage (ST2) comprising four adders and two data rotation units (C1, C3), a rotation unit comprising three adders and three multipliers according to a principle known to persons skilled in the art, a third stage (ST3) comprising six adders and one rotation unit (C6), and a fourth stage (ST4) comprising two adders and two multipliers, and producing odd transformed data Y1, Y3, Y5 and Y7, the odd transformed data Y0, Y2, Y4 and Y6 resulting from the data processed by the second stage and not processed in the fourth stage.

The implementation of the correction (ZER) by setting to zero the odd transformed data issuing from the global discrete transformation whose frequency is greater than the predicted maximum frequency is performed with four logic circuits performing the "AND" function between the odd transformed data and outputs of a circuit (PRED) calculating a predicted maximum frequency.

The implementation of the inverse discrete cosine transformation (IDCT2) comprises four successive stages:
- a fifth stage (ST5) comprising two adders and two multipliers able to process the corrected odd transformed data,
- a sixth stage (ST6) comprising six adders and one rotation unit (C6),
- a seventh stage (ST7) comprising four adders and two rotation units (C1, C3), and
- an eighth and last stage (ST8) comprising eight adders, and producing the filter data (XF0 to XF7).

The data filter circuit resulting from this conventional implementation would therefore lead to a complex solution comprising one DCT and one IDCT for each point of a block boundary. This solution would also have the drawback of both being expensive and power consuming.

In order to remedy this drawback, the data filter circuit according to a preferred embodiment of the invention is characterized in that it comprises:
- a first processing stage corresponding to a first sub-step of a discrete transformation and able to process the original data and to deliver odd intermediate transformed data, and a first set of processing stages corresponding to a set of sub-steps of the discrete transformation, able to process the odd intermediate transformed data and to deliver odd transformed data,
- a correction unit able to cancel out the odd transformed data other than those which are to be set to zero, and to deliver odd corrected transformed data, and
- a second set of processing stages corresponding to a set of sub-steps of an inverse discrete transformation able to process the odd corrected transformed data and to deliver intermediate filtered data, and a last processing stage corresponding to a last sub-step of the inverse discrete transformation and able to process the original data and the intermediate filtered data.

According to a particularly advantageous embodiment of the invention, the data filter circuit comprises:
- a first processing stage corresponding to a first sub-step of a discrete transformation and able to process the original data and to deliver odd and even intermediate transformed data, and a first set of processing stages corresponding to a set of sub-steps of the discrete transformation, able to process the odd intermediate transformed data and to deliver odd transformed data,
- a correction unit able to process the odd transformed data and to deliver odd corrected transformed data, and
- a second set of processing stages corresponding to a set of sub-steps of an inverse discrete transformation, able to process the odd corrected transformed data and to deliver intermediate filtered data, and a last processing stage corresponding to a last sub-step of the inverse discrete transformation and able to process the odd intermediate transformed data and the intermediate filtered data.

With such data filter circuits, the number of multipliers and adders is reduced, since at least 28 multiplication or addition operations are eliminated according to the preferred embodiment, and at least 24 operations according to the advantageous embodiment. The implementation of the data processing sequence comprising in series the discrete transformation, the correction of the odd transformed data and the inverse discrete transformation are thus simplified, resulting in a filter circuit that is both less expensive and consumes less power.

These and other aspects of the invention are apparent from and will be elucidated with reference to the non-limitative embodiments described hereinafter.

Figure 1:
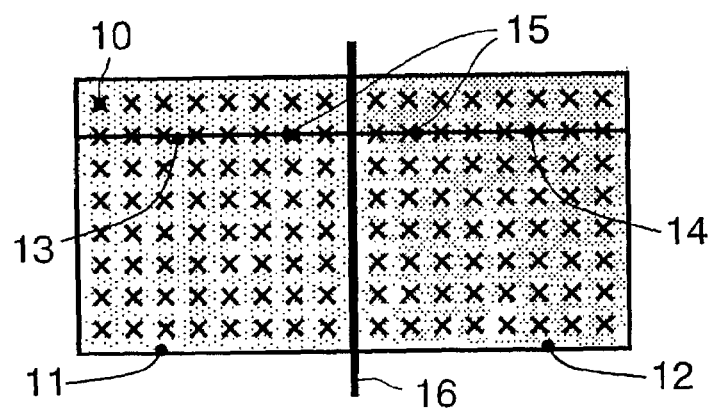
Figure 4:
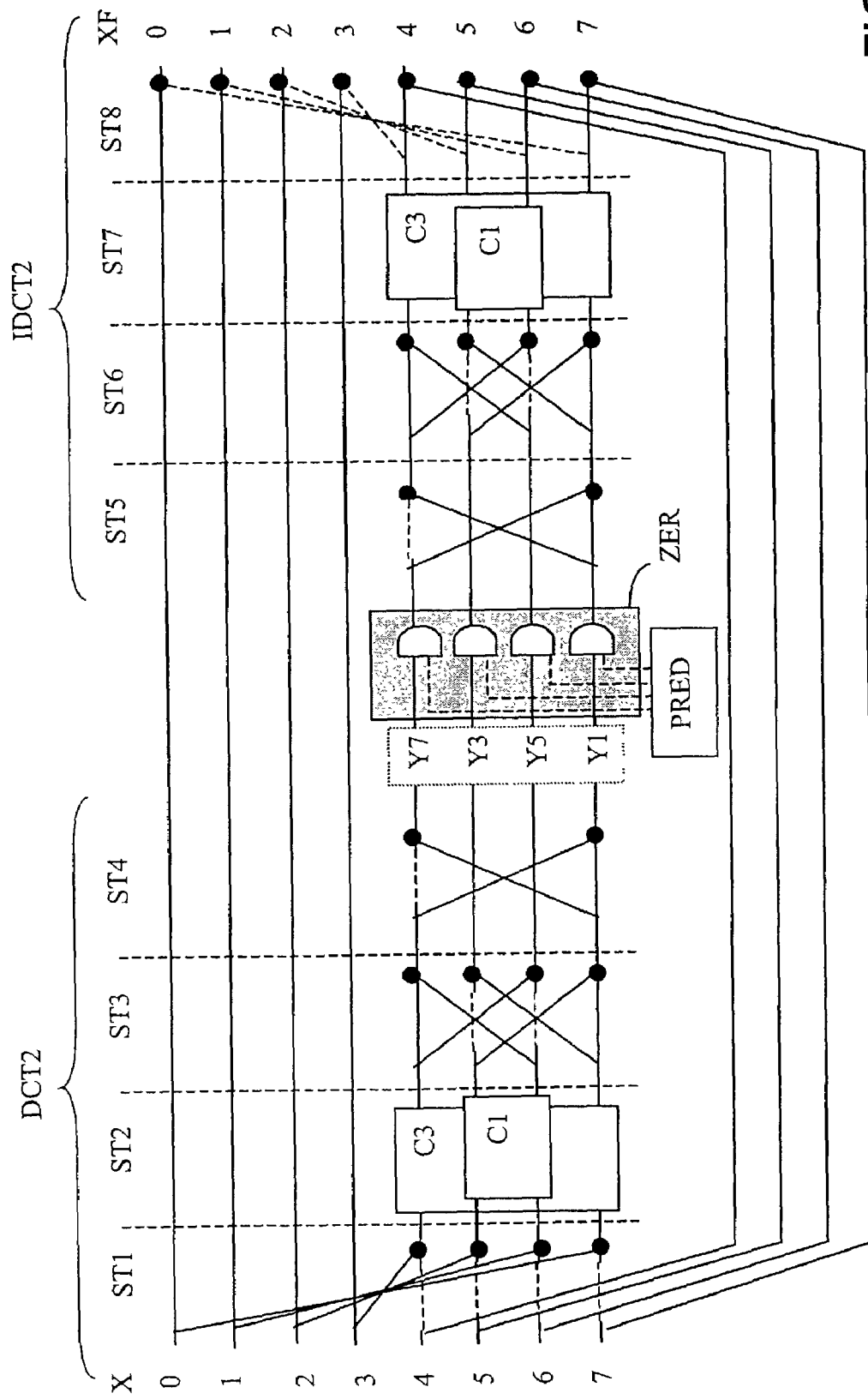
Figure 5:
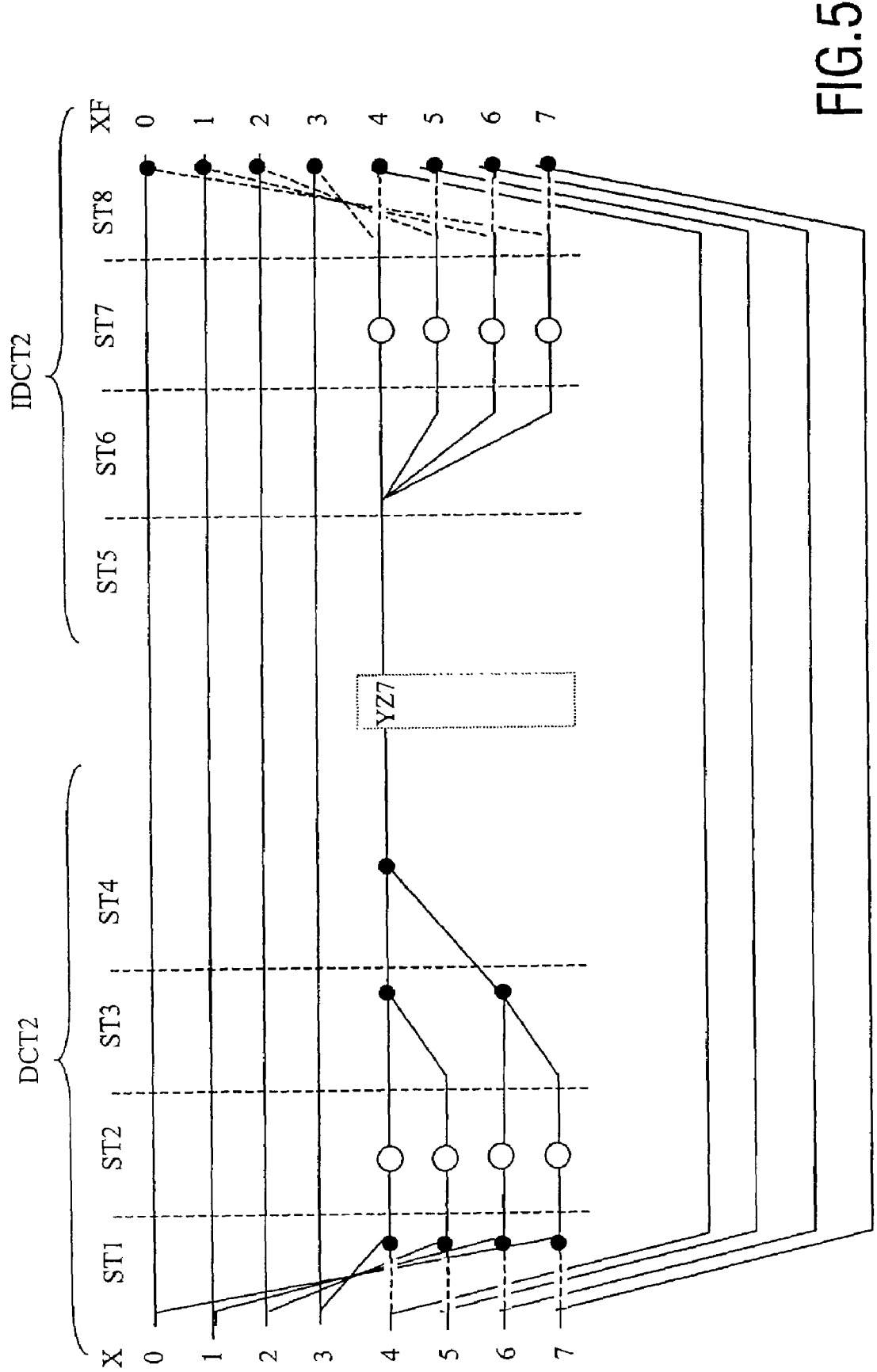
Figure 6:
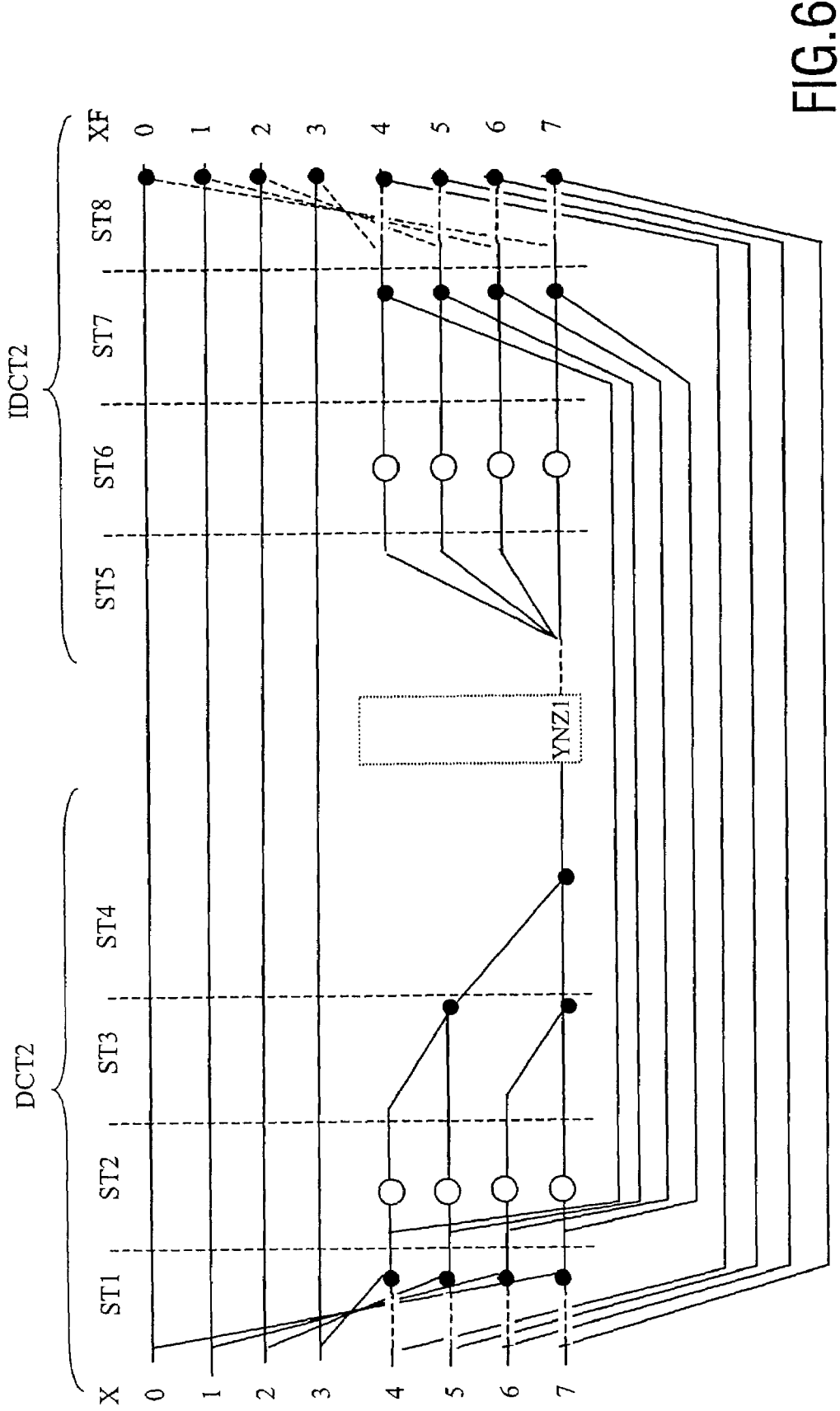
Figure 7:
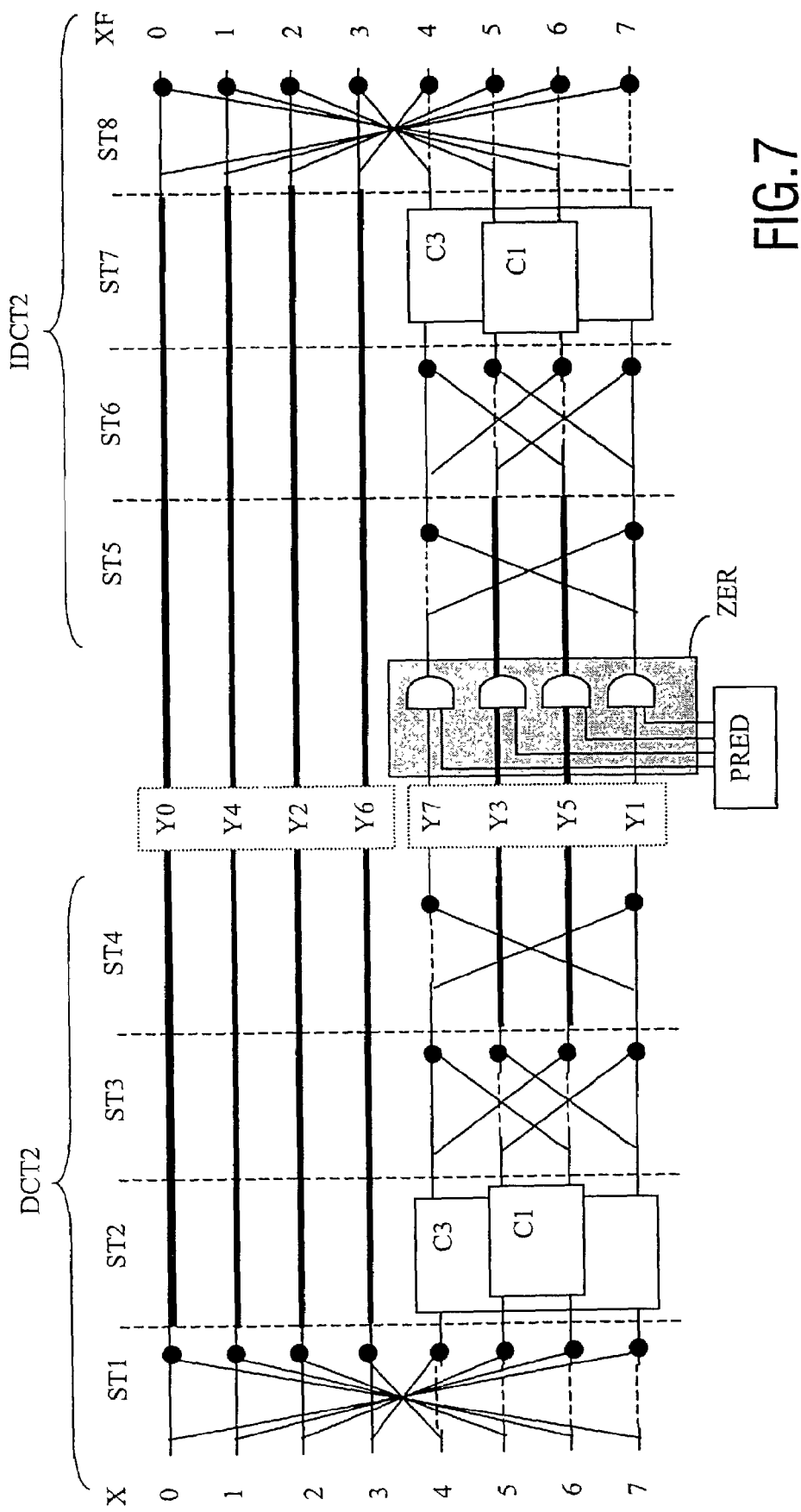
Figure 8:
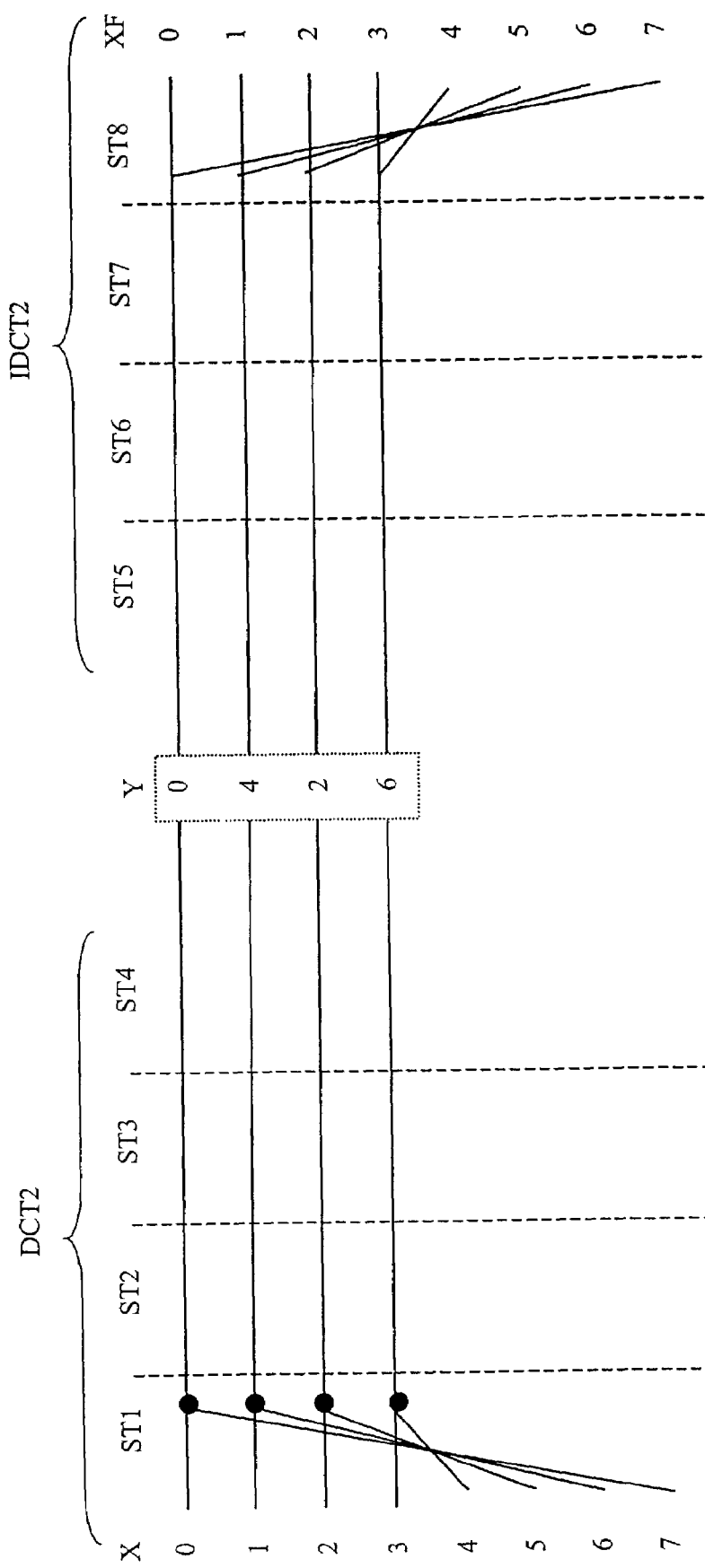

In the drawings:

FIG. 1 illustrates two adjacent segments disposed on each side of a block boundary, FIG. 2 depicts the data processing method of the prior art, FIG. 3 illustrates a circuit implementing in a conventional fashion the data processing method of the prior art, FIG. 4 depicts a preferred embodiment of the data filter circuit according to the invention, FIG. 5 depicts a first variant of the preferred embodiment of the data filter circuit according to the invention, FIG. 6 depicts a second variant of the preferred embodiment of the data filter circuit according to the invention, FIG. 7 depicts a second embodiment of the data filter circuit according to the invention, and FIG. 8 depicts a particular case of the second embodiment of the data filter circuit according to the invention.

The invention relates to a data filter circuit for correcting the blocking artifacts in the frequency domain. It is valid for any circuit able to implement in series the steps of discrete transformation of original data, correction of odd transformed data and inverse discrete transformation.

In the following description, the discrete transformation is a discrete cosine transformation. The invention takes the fact into consideration that the direct and inverse calculation paths of the discrete cosine transformation DCT and of the inverse discrete transformation IDCT are identical and are passed through in opposite directions. Thus, if the processing of a data item is not affected by the correction, the processing stages of the direct discrete cosine transformation DCT and inverse discrete cosine transformation IDCT corresponding to this data item can be eliminated to a certain extent.

In addition, the invention takes advantage in particular of the fact that for a number of data to be processed equal to a power of 2 the data paths of the even and odd transformed data are completely dissociated, as shown in FIG. 3, with the exception of a first processing stage (ST1) of the discrete cosine transformation DCT and a last processing stage (ST8) of the inverse discrete cosine transformation IDCT. The correction affecting solely the odd transformed data, the processing stages situated between the first and last stage and processing of the even data can be eliminated.

It will thus be clear to a person skilled in the art that the invention applies to any linear discrete transformation having the characteristics mentioned above.

In the preferred embodiment, the data filter circuit takes advantage of the linearity of the direct discrete cosine transformation DCT and inverse discrete cosine transformation IDCT. For this purpose, the original data X (X0 to X7), corresponding to luminance values of 8 pixels in our example, must undergo a discrete cosine transformation, resulting in transformed data Y, that is to say:

$Y=DCT(X)$

The transformed data Y can be divided into two sub-sets:
a first sub-set YZ corresponding to the frequencies for which the transformed data must be set to zero;
a second subset YNZ corresponding to frequencies for which the transformed data must not be set to zero.

The transformed data Y thus corresponds to the concatenation of these two sub-sets, that is to say:

$$Y=YZ|YNZ.$$

The filtered data XF are obtained by applying an inverse discrete cosine transformation to the corrected transformed data which are equal to YNZ, that is to say equal to zero, or in other words:

$$XF=IDCT(YNZ|0).$$

Using the linearity of the inverse discrete cosine transformation, there is obtained:

$$XF=IDCT(YNZ|YZ)-IDCT(0|YZ),$$

that is to say again XF=X−IDCT(0|YZ).

By calling DX the differential data which correspond to the difference between the original data X and the filtered data XF, this then gives:

$$DX=IDCT(0|YZ) \text{ and } XF=X-DX.$$

The data filter circuit according to the invention must therefore effect the following scheme:
effect a discrete cosine transformation DCT,
correct the transformed data by zeroing the transformed data YNZ and keeping the transformed data YZ,
performing an inverse discrete cosine transformation IDCT of the corrected data (0|YZ), producing the differential data DX, and
subtracting the differential data DX from the original data X, thus resulting in filtered data XF.

In this way a circuit is obtained which functions in differential mode and a particularly economical implementation of which is illustrated in FIG. 4. The data filter circuit according to this functioning mode comprises four stages corresponding to the discrete cosine transformation (DCT2):
a first stage (ST1) comprises four adders each performing for lines 4 to 7 a subtraction of an original data item X(j) of line j from an original data item X(7−j) of line (7−j), and delivering odd intermediate transformed data;
a second stage (ST2) comprises two rotation units (C1, C3) effecting the processing of the odd intermediate transformed data corresponding respectively on the one hand to lines 5 and 6 and on the other hand to lines 4 and 7;
a third stage (ST3) comprises four adders performing in order of lines 4 to 7:
an addition of the data issuing from lines 4 and 6 of the second stage,
a subtraction of the data item issuing from line 5 of the second stage from that of line 7, producing an odd transformed data item Y3,
a subtraction of the data item issuing from line 6 of the second stage from that of line 4, producing an odd transformed data item Y5,
an addition of the data issuing from lines 5 and 7 of the second stage;
a fourth stage (ST4) comprising two adders performing:
for line 4 a subtraction of the data item issuing from line 4 of the third stage from that issuing from line 7, producing an odd transformed data item Y7,
for line 7 an addition of the data issuing from lines 4 and 7 of the third stage, producing an odd transformed data item Y1.

A correction unit (ZER) for the odd transformed data is implemented with four logic circuits performing the "AND" function. The inputs of the "AND" logic circuits are on the one hand Y1, Y3, Y5 or Y7 and on the other hand an output value opposite to the value produced by a circuit PRED for calculating a predicted maximum frequency. This output value is 1 if the odd transformed data item YZ is of a frequency greater than the predicted maximum frequency and 0 in the reverse case YNZ. The odd corrected transformed data issuing from the logic "ANDs" are therefore either odd transformed data YZ which are to be set to zero, or 0. In other words, the correction unit (ZER) cancels out the odd transformed data YNZ other than those YZ which are to be set to zero.

Thus the h odd data, with h here between 0 and 4, whose frequency is greater than the predicted maximum frequency, are not corrected while the other odd data are set to zero in order to be processed by the inverse discrete transformation (IDCT2) so as to generate the differential data DX.

Finally, the data filter circuit according to this embodiment comprises four stages corresponding to the inverse discrete cosine transformation (IDCT2):
a fifth stage (ST5) comprising two adders performing, on the corrected odd transformed data:
for line 4, a subtraction of the data item issuing from line 4 of the correction unit from that issuing from line 7,
for line 7, an addition of the data issuing from lines 4 and 7 of the correction unit;
a sixth stage (ST6) comprising four adders performing in order of lines 4 to 7:
an addition of the data issuing from lines 4 and 6 of the fifth stage,
a subtraction of the data item issuing from line 5 of the fifth stage from that issuing from line 7,
a subtraction of the data item issuing from line 6 of the fifth stage from that issuing from line 4,
an addition of the data issuing from lines 5 and 7 of the fifth stage;
a seventh stage (ST7) comprising two rotation units (C1, C3) effecting the processing of the data issuing from the first stage corresponding respectively on the one hand to lines 5 and 6 and on the other hand to lines 4 and 7, and delivering intermediate filtered data;
an eighth and last stage (ST8) comprising eight adders each performing:
for lines j=0 to 3, a subtraction of an intermediate filtered data item of line (7−j) from the original data item X(j) of line j,
for lines j=4 to 7, an addition of an intermediate filtered data item of line j and the original data item X(j) of the same line.

The last stage then acts as a differential stage, able to subtract the intermediate filtered data issuing from the seventh stage from a first half of the original data (X0–X3) and to add said intermediate filtered data to a second half of the original data (X4–X7).

In addition, by virtue of the linearity of the direct and inverse discrete cosine transformations, the multiplications performed by the fourth and fifth stages in FIG. 3 have also been eliminated since they do not affect the final result.

In the case of the embodiment in FIG. 4, the number of operations is equal to 48, that is to say 36 additions and 12 multiplications, that is to say 32 operations less than the conventional embodiment in FIG. 3.

The circuit can be simplified in some particular cases. For example, when a minority of odd transformed data are to be set to zero, it is possible to advantageously replace the processing path of the second data half (X4–X7 to XF4–XF7) in FIG. 4 with a simpler processing path.

FIG. 5 depicts a simplification of the circuit in FIG. 4 when only one odd transformed data item YZ7 corresponding to the maximum frequency, k=7 in our case, is to be set to zero.

The first stage (ST1) and the last stage remain unchanged compared with the circuit in FIG. 4. On the other hand, the second stage (ST2) of the data filter circuit according to this embodiment now comprises 4 multipliers, each odd intermediate transformed data item being multiplied by a multiplying coefficient. The third stage (ST3) comprises 2 adders effecting respectively the sum on the one hand of the data issuing from lines 4 and 5 of the second stage and on the other hand the data issuing from lines 6 and 7 of the second stage. The fourth stage (ST4) performs the addition of the results from these two adders, thus forming the odd transformed data item YZ7. The fifth stage (ST5) does nothing. The sixth stage (ST6) duplicates the odd transformed data item YZ7 for lines 4 to 7 and the seventh stage (ST7) multiplies each duplicated data item by a multiplying coefficient.

In the case of the embodiment in FIG. 5, the number of operations is no more than 25, that is to say 17 additions and 8 multiplications.

In another example, a majority of odd transformed data are to be set to zero. FIG. 6 depicts a simplification of the circuit in FIG. 4 when only the odd transformed data item YNZ1 corresponding to the minimum odd frequency k=1 is not to be set to zero.

The first stage (ST1) remains unchanged compared with the circuit in FIG. 4. The second stage (ST2) of the data filter circuit according to this embodiment now comprises four multipliers, each odd intermediate transformed data item being multiplied by a multiplying coefficient. The third stage (ST3) comprises two adders effecting the sum on the one hand of the data issuing from lines 4 and 5 of the second stage and on the other hand of the data issuing from lines 6 and 7 of the second stage, respectively. The fourth stage (ST4) performs the addition of the results from these two adders, thus forming the odd transformed data item at YNZ1. The fifth stage (ST5) duplicates the opposite of the transformed data item YNZ1 for lines 4 to 7. The sixth stage (ST6) multiplies each duplicated data item by a multiplying coefficient. The seventh stage (ST7) comprises four adders each effecting a sum of a multiplied data item and an odd intermediate transformed data item from the same line. The eighth and last stage (ST8) comprises eight adders, four adders performing the same subtractions as in FIG. 4 for lines 0 to 3, and four adders each performing a subtraction of an intermediate filtered data item of line j from an original data item X(j) of the same line for lines 4 to 7.

In the case of the embodiment in FIG. 6, the number of operations is equal to 29, that is to say 21 additions and 8 multiplications.

In a particularly advantageous embodiment, illustrated in FIG. 7, the data filter circuit comprises:
 a first processing stage (ST1) corresponding to a first sub-step of the discrete transformation (DCT2) and able to process all the original data and to deliver even intermediate transformed data (Y0, Y4, Y2 and Y6) and odd intermediate transformed data which, after the processings by the second, third and fourth stages (ST2 to ST4) identical to those of FIG. 4, become odd transformed data (Y7, Y3, Y5 and Y1),
 a correction unit (ZER) consisting of four logic circuits performing the "AND" function, whose output is either zero for the h odd transformed data YZ issuing from the fourth stage whose frequency is greater than the predicted maximum frequency, or directly the values of the other odd transformed data YNZ issuing from the fourth stage,
 a last processing stage (ST8) corresponding to a last sub-step of the inverse discrete transformation (IDCT2) able to process a first data half corresponding to the even intermediate transformed data (Y0, Y4, Y2 and Y6) produced by the first processing stage, and a second data half, referred to as intermediate filtered data and corresponding to the data resulting from the processing of the odd transformed data (Y7, Y3, Y5 and Y1), by fifth, sixth and seventh stages (ST5 to ST7) identical to those in FIG. 4.

The last stage (ST8) comprises eight adders each performing:
 for lines j=0 to 3 an addition of the intermediate filtered data item issuing from line (7−j) of the seventh stage and the even intermediate transformed data item issuing from line j of the first stage,
 for lines j=4 to 7, a subtraction of the intermediate filtered data item issuing from line j of the seventh stage from the even intermediate transformed data item issuing from line (7−j) of the first stage.

In the case of the embodiment in FIG. 7, the number of operations is equal to 52, that is to say 40 additions and 12 multiplications.

The data filter circuit in FIG. 7 can be simplified in the case where all the odd transformed data are to be set to zero. FIG. 6 illustrates this particular case. The odd intermediate transformed data then no longer need to be calculated and there remain only:
 the first processing stage (ST1) comprising four adders performing the same additions as in FIG. 7 for lines 0 to 3,
 the last processing stage (ST8), which duplicates for each line j in the second data half (j=4 to 7) the even intermediate transformed data item of line (7−j).

Thus a filtered data item XF(j) of line j is equal to a filtered data item XF(7−j) of line (7−j), that is to say $XF(j)=XF(7-j)=(X(j)+X(7-j))/2$.

In the case of the embodiment in FIG. 8, the number of operations is now only four additions.

The circuits such as those described in FIGS. 4 or 7, 5, 6 and 8 can be used in a data filtering device, a control circuit making it possible to select the suitable circuit from among this set of circuits according to the number h of odd transformed data which are to be set to zero.

The filter circuit in accordance with the invention can be integrated as an output unit of a video decoder, or an an input unit of a television receiver, in order to process decoded data.

The invention has been implemented in the context of the implementation of the data filtering method of the prior art. The simplifications made to the filtering architecture also improve said data filtering method.

The invention therefore relates to a method of filtering a set of original data (X0–X7) comprising in series the steps of:
 discrete transformation (DCT2) comprising a first sub-step (ST1) able to process the original data and to deliver odd intermediate transformed data, and a set of sub-steps (ST2 to ST4) able to process the odd intermediate transformed data and to deliver odd transformed data, correction (ZER) able to process the odd transformed data, and to deliver odd corrected transformed data by canceling out the odd transformed data other than those which are to be set to zero, and inverse discrete transformation (IDCT2) comprising a set of sub-steps (ST5 to ST7) able to process the odd corrected transformed data and to deliver intermediate filtered data, and a last sub-step (ST8) able to process the original data (X0–X7) and the intermediate filtered data.

The invention also relates to a method of filtering a set of original data (X0–X7) comprising in series the steps of:

discrete transformation (DCT2) comprising a first sub-step (ST1) able to process the original data and to deliver even and odd intermediate transformed data, and a set of sub-steps (ST2 to ST4) able to process the odd intermediate transformed data and to deliver odd transformed data, correction (ZER) able to process the odd transformed data and to deliver odd corrected transformed data, and inverse discrete transformation (IDCT2) comprising a set of sub-steps (ST5 to ST7) able to process odd corrected transformed data and to deliver intermediate filtered data, and a last sub-step (ST8) able to process the even intermediate transformed data and the intermediate filtered data.

The reduction in the number of operations performed by each of the filtering methods makes it possible to save on computing resources or to accelerate the time taken for processing the original data.

There are many ways of implementing the previously described steps by means of software. It is possible to implement these steps by means of a video decoder circuit or a television receiver circuit, said circuit being suitably programmed. A set of instructions contained in a programming memory can cause the circuit to perform the different steps previously described. The set of instructions can also be loaded in the programming memory by reading a data medium such as, for example, a disc which contains the set of instructions. The reading can also be performed by means of a communication network such as for example the Internet. In this case, a service provider will make the set of instructions available to interested parties.

No reference sign between parentheses in the present text should be interpreted limitingly. The verb "comprise" and its conjugations does not exclude the presence of elements or steps other than those listed in a sentence. The word "one" preceding an element or step does not exclude the presence of a plurality of these elements or steps.

The invention claimed is:

1. A circuit for filtering a set of original data to remove blocking artifacts in the set of original data, said circuit comprising:

a first processing stage , corresponding to a first sub-step of a discrete transformation, for transform processing the original data to form odd intermediate transformed data, and a first set of processing stages, corresponding to a set of substeps of the discrete transformation, for processing the odd intermediate transformed data to form odd transformed data;

a correction unit for cancelling out certain of the odd transformed data other than those which are to be set to zero, said correction unit thereby forming odd corrected transformed data; and a second set of processing stages, corresponding to a set of sub-steps of an inverse discrete transformation (IDCT2), for processing the odd corrected transformed data to form intermediate filtered data, and a last processing stage, corresponding to a last sub-step of the inverse discrete transformation, for processing the original data and the intermediate filtered data to form a filtered set of data, wherein the circuit corrects blocking artifacts in a frequency domain.

2. A circuit for filtering a set of original data to remove blocking artifacts in the set of original data, said circuit comprising:

a first processing stage, corresponding to a first sub-step of a discrete transformation, for transform processing the original data to form odd and even intermediate transformed data, and a first set of processing stages, corresponding to a set of sub-steps of the discrete transformation, processing the odd intermediate transformed data to form odd transformed data;

a correction unit for processing the odd transformed data to form odd corrected transformed data; and a second set of processing stages, corresponding to a set of sub-steps of an inverse discrete transformation, for processing the odd corrected transformed data to form intermediate filtered data, and a last processing stage, corresponding to a last sub-step of the inverse discrete transformation, for processing the even intermediate transformed data and the intermediate filtered data to form a filtered set if data, wherein the circuit corrects blocking artifacts in a frequency domain.

3. A method of filtering a set of original data to remove blocking artifacts in the set of original data, said method comprising, in series, the steps of:

discrete transforming the set of original data, said discrete transforming comprising a first sub-step of transform processing the original data to form odd intermediate transformed data, a set of sub-steps of processing the odd intermediate transformed data to form odd transformed data;

correction processing the odd transformed data to form odd corrected transformed data, said correction processing cancelling out portions of the odd transformed data other than those which are to be to zero; and inverse discrete transforming the odd corrected transformed data, said inverse discrete transforming comprising a set of sub-steps of processing the odd corrected transformed data to form intermediate filtered data, and a last sub-step of processing the original data and the intermediate data to form a filtered set of data, wherein blocking artifacts in a frequency domain for the set of original data are corrected.

4. A method of filtering a set of original data to remove blocking artifacts in the of original data, said method comprising, in series, the steps of:

discrete transforming said original data, said discrete transforming comprising a first sub-step of transform processing the original data to form odd and even intermediate transformed data, and a set of sub-steps of processing the odd intermediate transformed data to form odd transformed data;

correction processing the odd transformed data to form odd corrected transformed data, and inverse discrete transforming the odd corrected transformed data, said inverse discrete transforming comprising a set of sub-steps of process the odd corrected transformed data to form intermediate filtered data, and a last sub-step of processing the even intermediate transformed data and the intermediate filtered data to form a filtered set of data, wherein a blocking artifact in a frequency domain for the set of original data is corrected.

5. A video decoder for forming decoded data and comprising a filter circuit as claimed in claim 1, said video decoder processing the decoded data in order to form processed decoded data.

6. A television receiver for receiving decoded data and comprising a filter circuit as claimed in one of claim 1, said television receiver processing ten decoded data in order to form processed decoded data to be displayed on a screen of said television receiver.

7. a computer readable medium embodied with a computer program comprising program instructions for implementing a method of filtering as claimed in claim 3, when said program is executed by a processor.

* * * * *